July 27, 1937. H. E. N. PRUVOT 2,088,386
LUBRICATING DEVICE
Original Filed July 14, 1933
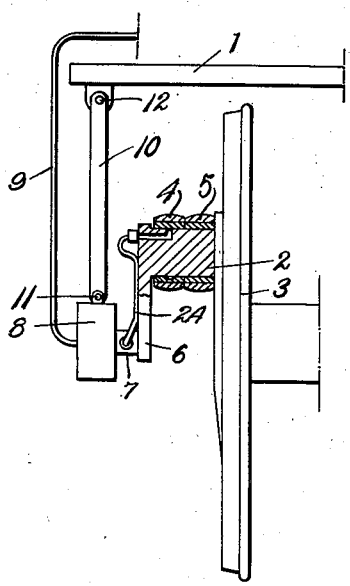
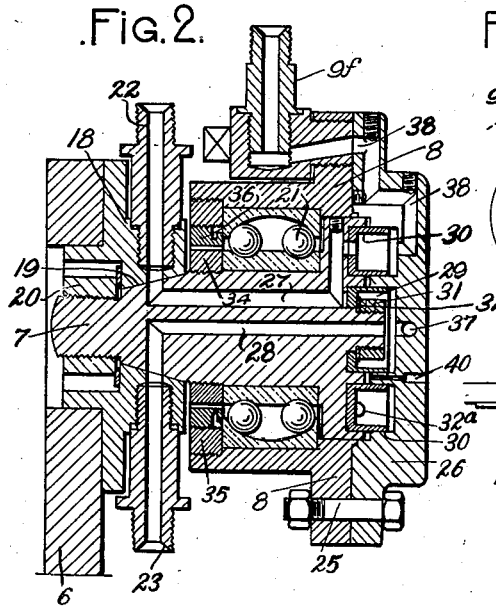
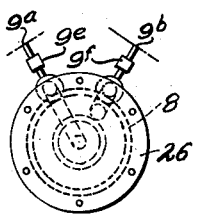
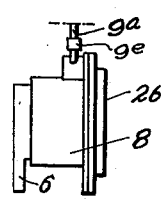
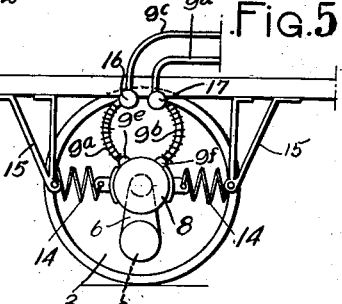

Patented July 27, 1937

2,088,386

UNITED STATES PATENT OFFICE 2,088,386

LUBRICATING DEVICE

Henri Eloi Norbert Pruvot, Sotteville-Les-Rouen, France, assignor to C. C. Wakefield & Company Limited, London, England Original application July 14, 1933, Serial No. 680,482. Divided and this application March 24, 1934, Serial No. 717,260. In France July 18, 1932

4 Claims. (Cl. 184—8)

The present invention has for its object a device for the lubrication under pressure of the movable parts of machines and is a division of my copending application Ser. No. 680,482 filed July 14, 1933.

The device is used in case the bearing to be lubricated is completely enclosed, but remains mechanically accessible at one of its ends. It is particularly the case of a connecting rod mounted on a crank-plate, or on a journal in overhanging position relatively to the driving shaft.

Generally speaking, the invention has for its object improvements in devices for the lubrication of a member movable relatively to a fixed source of oil supply, and particularly of a crank pin by means of a return or countercrank.

These improvements are mainly characterized by the fact that the rotary joint of the return or countercrank is movably mounted relatively to the fixed source of supply.

The rotary joint of the return or countercrank can be connected to a fixed support by a link.

The rotary joint of the return or countercrank can be connected to a fixed support by springs.

The rotary joint is constituted by the combination: of a central shaft perforated with channels the number of which is a function of the number of connecting rods, of co-axial rings for constituting, at one of the ends of the shaft, chambers connected to the oil inlet and to each corresponding channel, the rings being co-axial with the shaft.

Figure 1 is a diagrammatic elevation of the unit with partial section showing a constructional form of a device according to the invention adapted for the lubrication of a journal of a locomotive wheel by using a countercrank.

Figure 2 is an axial longitudinal section of a device according to the invention adapted for ensuring the lubrication of two distinct connecting rods pivoted to the same journal and operating side by side.

Figures 3 and 4 are front and side views respectively on a reduced scale showing the joint illustrated in the preceding figure in order to show the location of the drilled holes.

Figure 5 shows the device illustrated in Figures 2, 3 and 4 in a mounted position according to a constructional form different from Figure 1.

The apparatus described hereinafter is adapted for lubricating under pressure, a connecting rod mounted on the journal of a locomotive wheel.

In the case of Figures 2, 3, 4 and 5, the apparatus is adapted for ensuring the lubrication of a driving rod and a coupling rod mounted side by side on the same journal of a locomotive wheel.

In the example of Fig. 1, the underframe of the locomotives is indicated at 1, this underframe supporting the fixed source of supply not shown. The journal 2 to be lubricated is fixed on the wheel 3 and has mounted thereon two connecting rods 4 and 5. The journal 2 is formed with a return or countercrank 6 provided in turn with a journal 7 coaxial with the wheel 3 and on which journal 7 is mounted a member 8 receiving the oil under pressure from the fixed source of supply through a piping 9. The journal 7 and the member 8 constitute a rotary joint in which the journal 7 rotates in the member 8.

According to an essential feature of the invention, the member 8 is movably mounted on the underframe 1 for permitting, as shown in Figure 1, the transverse displacements of the wheel 3 relatively to the underframe 1 without affecting the lubrication. In the example of Figure 1, the connection between the member 8 and the underframe 1 is realized through the medium of a connecting rod 10 operatively connected for instance by loose pivots at its ends about two parallel axes 11 and 12 to provide for any lateral movement which may be encountered.

Figure 5 shows another mounting in which the member 8 is resiliently connected to the underframe 1 through the medium of springs 14 and supports 15. In this example, the detailed construction of which is more particularly shown in Figures 2 and 3, the rotary joint is specially adapted for ensuring by two independent circuits the lubrication of two connecting rods such as 4 and 5 journalled side by side on the crank pin 2 of the wheel 3. In this case, the oil under pressure is led to the member 8 through two flexible tubes 9a and 9b which are themselves supplied through the medium of joints 16 and 17 (Fig. 5) and through two pipings 9c and 9d connected to the fixed supply of oil.

In the example of Fig. 2, the counter or return crank is indicated at 6. This counter or return crank is rigid with a member 18 keyed on the journal 7 through the medium of a conical bearing 19 and a nut 20. The member 8 is mounted on the journal 7 through the medium of a ball bearing 21.

The member 18 has two ducts 22 and 23 for pipes such as 24 (Fig. 1) which permit the passage of the oil to the journal 2 and opposite two connecting rods 4 and 5.

On the member 8 are mounted two tubes 9e and 9f, the tube 9f being only shown in Figure 2 while these two tubes appear in Figure 3. These tubes 9e and 9f are connected to pipes 9a and 9b for the supply of oil (Fig. 5). A member 26 is mounted at the end of the member 8 through the medium of bolts 25.

The journal or shaft 7 is provided with two longitudinal channels 27 and 28 which communicate, as shown, with the two ducts or pipes 22 and 23. At its other end, the shaft 7 has two special circular segments 29 and 30 made of a flexible material unaffected by the action of the oil (vulcanized fiber, cellophane etc.) or constituted by a pressed metal member (made of bronze, pure copper) of small thickness. The segment 29 is cylindrical and is secured to the shaft 7 by a nut 31 and a washer 32. The annular segment 30 is secured to the shaft 7 by screws such as 32a. The channel 28 opens in the chamber laterally bounded by the segment 31 and the hole 27 opens in the chamber bounded by the inner and outer walls of the segment 30.

The ball bearing 21 includes inner and outer race rings, the inner of which is mounted on the shaft 7 by the nut 34. The bearing supports the body 8 with which it is rendered rigid by the nut 35. A special screw threaded ring 36 made of vulcanized fiber or other flexible material is engaged with the outer nut 35 and constitutes a locking device.

The body 8 is closed by the member 26 forming a cover. The cover 26 is provided on its inner face with two concentric recesses. One of these recesses is of cylindrical shape, being located at the center of cover 26 and receiving the segment 29 which is fitted therein with slight friction.

Finally, the cover 26 is perforated at 37 and 38 so that the recesses which receive the segments are each in communication with the tubes 9e and 9f. (The Figures 3 and 4 show how these perforations appear in elevation.)

The operation of the entire device is as follows:

The oil under pressure, supplied by the mechanical lubricator installed on the machine, is admitted at 9e and 9f as indicated above. The oil passes through the channels 37 and 38 and enters the chambers receiving the segments 29 and 30 and then passes through the channels 28 and 27 and is admitted in the tubes 23 and 22.

The member 8 being mounted as shown in Figure 2, the rotation of the axle of the locomotive and consequently of the member 18 secured to the counter-crank 6 drives in rotation only the shaft 7 and the segments it carries, this rotation taking place about the ball bearing 21. The rotary joint is therefore provided between the segments 29 and 30 and the member 26. The pressure of the oil ensures the fluid-tightness of the segments, the walls thereof bearing against those of the member 26. A hole 40 perforated in the partition separating the chambers provided for the segments 29 and 30 puts in communication with the atmosphere the annular space between these segments and thereby avoids any back pressure.

What I claim is:—

1. In a device for the lubrication of a member movable relatively to a fixed source of oil supply and particularly of a crank pin by means of a counter-crank having a rotary joint and means supporting said rotary joint for bodily movement relatively to the fixed source of oil supply.

2. In a device for the lubrication of a member movable relatively to a fixed source of oil supply and particularly of a crank pin by means of a counter-crank having a rotary joint and means supporting said rotary joint for bodily movement relatively to the fixed source of oil supply, the said means including a connecting rod operatively connected about two parallel axes on the one hand to the support of the fixed source and to the joint on the other hand.

3. In a device for the lubrication of a member movable relatively to a fixed source of oil supply and particularly of a crank pin by means of a counter-crank having a rotary joint, means supporting said rotary joint for bodily movement relatively to the fixed source of oil supply, the said means including springs, and flexible piping for effecting the admission of the lubricant to the rotary joint.

4. In a device for the lubrication of a member movable relative to a fixed source of oil supply and particularly a crank pin by means of a counter-crank having a rotary joint, means for supporting said rotary joint for bodily movement relative to the fixed source of oil supply, the said rotary joint including a central shaft rigid with the counter-crank and provided with a plurality of longitudinal channels, each of said channels communicating at one end with the member to be lubricated, coaxial rings on the other end of the shaft for forming chambers which are in communication with the adjacent ends of the channels in the said shaft, a cover for partly housing the rings and also provided with channels opening into the chambers bounded by the rings and which are in communication with the fixed source of oil supply, a member to which the cover is fastened, and a ball bearing for journalling the said latter member to the said central shaft.

HENRI ELOI NORBERT PRUVOT.